US010244520B2

(12) United States Patent
Kato et al.

(10) Patent No.: US 10,244,520 B2
(45) Date of Patent: Mar. 26, 2019

(54) TERMINAL APPARATUS, BASE STATION APPARATUS, AND COMMUNICATION METHOD

(71) Applicant: Sharp Kabushiki Kaisha, Sakai, Osaka (JP)

(72) Inventors: Katsuya Kato, Sakai (JP); Ryota Yamada, Sakai (JP); Hiromichi Tomeba, Sakai (JP); Kozue Yokomakura, Sakai (JP); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/124,390

(22) PCT Filed: Feb. 25, 2015

(86) PCT No.: PCT/JP2015/055491
§ 371 (c)(1),
(2) Date: Sep. 8, 2016

(87) PCT Pub. No.: WO2015/141418
PCT Pub. Date: Sep. 24, 2015

(65) Prior Publication Data
US 2017/0019885 A1 Jan. 19, 2017

(30) Foreign Application Priority Data
Mar. 20, 2014 (JP) .................................. 2014-057350

(51) Int. Cl.
*H04W 72/04* (2009.01)
*H04J 11/00* (2006.01)
(Continued)

(52) U.S. Cl.
CPC ......... *H04W 72/042* (2013.01); *H04J 11/005* (2013.01); *H04J 11/0026* (2013.01);
(Continued)

(58) Field of Classification Search
CPC .. H04J 11/0026; H04J 11/005; H04W 72/042; H04W 72/082; H04W 88/02; H04W 88/08; H04B 1/10
See application file for complete search history.

(56) References Cited

U.S. PATENT DOCUMENTS 8,670,432 B2   3/2014  Luo
8,982,752 B2   3/2015  Miki et al.
(Continued)

FOREIGN PATENT DOCUMENTS

JP   2011-223112 A   11/2011
JP   2012-531170 A   12/2012
JP   2013-009290 A    1/2013

OTHER PUBLICATIONS

Official Communication issued in International Patent Application No. PCT/JP2015/055491, dated Apr. 7, 2015.
(Continued)

*Primary Examiner* — Mandish K Randhawa
(74) *Attorney, Agent, or Firm* — Keating & Bennett, LLP

(57) ABSTRACT

A terminal apparatus improves throughput while suppressing control information of an interfering signal. The terminal device includes: a higher layer that determines an instruction as to whether to apply NAICS; a receiving unit that receives downlink control information; and a control unit that, in a case where it has been specified on the higher layer that NAICS is applied, determines, on the basis of information that is contained in the downlink control information and indicates whether to perform interference cancellation or suppression, whether to perform interference cancellation or
(Continued)

suppression. The receiving unit receives, in a user-specific search space, the downlink control information containing the information indicating whether to perform interference cancellation or suppression.

3 Claims, 5 Drawing Sheets

(51) Int. Cl.
    *H04W 72/08*     (2009.01)
    *H04B 1/10*     (2006.01)
    *H04W 88/02*     (2009.01)
    *H04W 88/08*     (2009.01)

(52) U.S. Cl.
    CPC ............. *H04W 72/082* (2013.01); *H04B 1/10* (2013.01); *H04W 88/02* (2013.01); *H04W 88/08* (2013.01)

(56) References Cited

U.S. PATENT DOCUMENTS

| | | |
|---|---|---|
| 9,392,391 B2 | 7/2016 | Luo |
| 2010/0322227 A1 | 12/2010 | Luo |
| 2013/0058294 A1 | 3/2013 | Miki et al. |
| 2013/0301531 A1 | 11/2013 | Tao |
| 2013/0303157 A1 | 11/2013 | Tao |
| 2013/0303217 A1 | 11/2013 | Tao |
| 2014/0044091 A1 | 2/2014 | Kishiyama |
| 2014/0301303 A1* | 10/2014 | Roman ................. H04L 5/0073 370/329 |
| 2014/0362769 A1* | 12/2014 | Chen .................... H04J 11/0036 370/328 |
| 2015/0078285 A1* | 3/2015 | Kim ..................... H04B 7/2656 370/329 |

OTHER PUBLICATIONS

MediaTek et al., "Study on Network-Assisted Interference Cancellation and Suppression for LTE", 3GPP TSG RAN Meeting #59, RP-130404, Feb. 26-Mar. 1, 2013, 7 pages.

Broadcom Corporation, "Signaling and Coordination in NAICS", 3GPP TSG-RAN WG1 Meeting #75, R1-135547, Nov. 11-15, 2013, 3 pages.

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

BACKGROUND ART

In recent years, along with the widespread use of smartphones and tablet terminals, the traffic of mobile transmissions has been exponentially increasing and is expected to further increase in the future. As one of the measures against such increases in wireless traffic, the high-density arrangement of base stations by a heterogeneous network has been under consideration. The high-density arrangement of base stations is intended to reduce the load on macro base stations by arranging low-power nodes (LPNs) or the like in macrocells and connecting a terminal apparatus to a low-power node. At this point in time, inter-cell interference becomes a problem.

Further, for improving throughput, MU-MIMO (multi-user multiple input multiple output), in which a plurality of terminal apparatuses are spatially multiplexed, has been under consideration. In MU-MIMO, interference between terminal apparatuses (inter-user interference) becomes a problem.

In relation to such inter-cell interference and inter-user interference, the 3GPP (3rd Generation Partnership Project) has been considering NAICS (network-assisted interference cancellation and suppression), in which a terminal apparatus suppresses or cancels an interfering signal. In NAICS, a terminal apparatus receives parameters pertaining to another terminal apparatus that is interfering, uses the parameters to detect a signal addressed to the interfering terminal apparatus, and cancels the interfering signal. This allows the terminal apparatus to obtain a desired signal addressed to the terminal apparatus. NAICS is described in NPL 1.

CITATION LIST

Non Patent Literature

NPL 1: RP-130404, "Study on Network-Assisted Interference Cancellation and Suppression for LTE," 3GPP TSG RAN Meeting #59, March 2013.

SUMMARY OF INVENTION

Technical Problem

In order for a terminal apparatus to cancel or suppress an interfering signal, information on the interfering signal is needed. However, transmission of the information on the interfering signal to the terminal apparatus by a base station apparatus leads to an increase in control signal, and by extension to deterioration in throughput.

The present invention has been made in view of such circumstances and has as an object to provide a terminal apparatus, a base station apparatus, and a communication method that make it possible to improve throughput while suppressing control information of an interfering signal.

Solution to Problem

In order to solve the problems described above, a terminal apparatus, a base station apparatus, and a communication method according to the present invention are configured as follows:

A terminal apparatus of the present invention includes: a higher layer on which NAICS information is configured from the base station apparatus; a receiving unit that receives downlink control information; and a control unit that, in a case where the NAICS information has been configured, determines, on the basis of information that is contained in the downlink control information and indicates whether to perform interference cancellation or suppression, whether to perform interference cancellation or suppression.

Further, in the terminal apparatus of the present invention, the receiving unit receives, in a user-specific search space, the downlink control information containing the information indicating whether to perform interference cancellation or suppression.

Further, in the terminal apparatus of the present invention, in a case where the information indicating whether to perform interference cancellation or suppression indicates that the terminal apparatus is not instructed to perform interference cancellation or suppression, the control unit performs signal detection only with reference to control information of a signal addressed to the terminal apparatus.

A base station apparatus of the present invention is a base station apparatus that communicates with a terminal apparatus, and includes: a higher layer that configures NAICS information in the terminal apparatus; and a transmitting unit that, in a case where the NAICS information has been configured, transmits downlink control information containing information indicating whether to perform interference cancellation or suppression.

Further, in the base station apparatus of the present invention, in a case where the downlink control information is allocated to a user-specific search space, the information indicating whether to perform interference cancellation or suppression is incorporated into the downlink control information.

A communication method of the present invention is a method for communication in a terminal apparatus that communicates with a base station apparatus, and includes: configuring NAICS information on a higher layer from the base station apparatus; receiving downlink control information; and in a case where it has been specified on the higher layer that NAICS is applied, determining, on the basis of information that is contained in the downlink control information and indicates whether to perform interference cancellation or suppression, whether to perform interference cancellation or suppression.

A communication method of the present invention is a method for communication in a base station apparatus that communicates with a terminal apparatus, and includes: configuring NAICS information for the terminal apparatus on a higher layer; and in a case where the NAICS information has been configured, transmitting downlink control information containing information indicating whether to perform interference cancellation or suppression.

Advantageous Effects of Invention

The present invention makes it possible to improve throughput while suppressing control information of an interfering signal.

DESCRIPTION OF EMBODIMENTS

A communication system according to an embodiment of the present invention includes a base station apparatus (transmitting apparatus, cell, transmitting point, group of transmitting antennas, group of transmitting antenna ports, component carrier, eNodeB) and a terminal apparatus (terminal, mobile terminal, receiving point, receiving terminal, receiving apparatus, group of receiving antennas, group of receiving antenna ports, UE).

In the present embodiment, "X/Y" encompasses the meaning of "X or Y". In the present embodiment, "X/Y" encompasses the meaning of "X and Y". In the present embodiment, "X/Y" encompasses the meaning of "X and/or Y".

Figure 1:
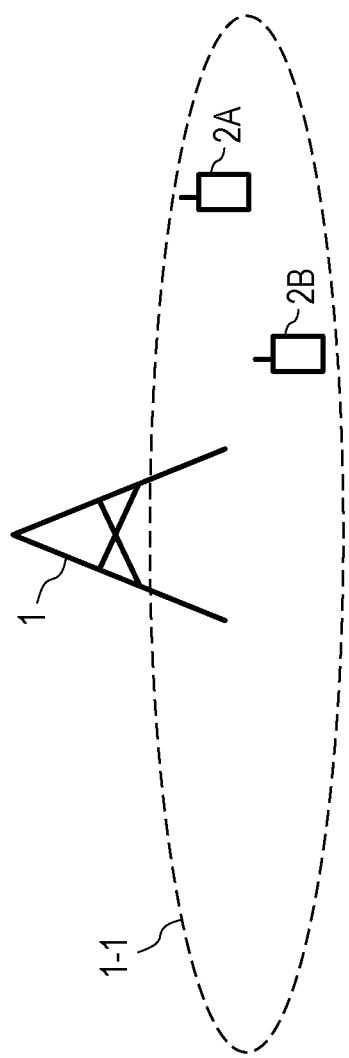
FIG. 1 is a diagram showing an example of a communication system according to an embodiment of the present invention.

FIG. 1 is a diagram showing an example of the communication system according to the present embodiment. As shown in FIG. 1, the communication system according to the present embodiment includes a base station apparatus 1 and terminal apparatuses 2A and 2B. Further, a coverage 1-1 is a range (communication area) within which the base station apparatus 1 is connectable to a terminal apparatus. It should be noted that the terminal apparatuses 2A and 2B are hereinafter sometimes referred to as "terminal apparatuses 2".

In FIG. 1, the base station apparatus 1 spatially multiplexes a signal addressed to the terminal apparatus 2A and a signal addressed to the terminal apparatus 2B. Received signals at a terminal apparatus 2 include a desired signal addressed to the terminal apparatus (also referred to as "first terminal apparatus") and a signal addressed to an interfering terminal apparatus (also referred to as "second terminal apparatus"). Specifically, received signals at the terminal apparatus 2A include a desired signal transmitted from the base station apparatus 1 and addressed to the terminal apparatus 2A and an interfering signal that is a signal addressed to the terminal apparatus 2B. Similarly, received signals at the terminal apparatus 2B include a desired signal transmitted from the base station apparatus 1 and addressed to the terminal apparatus 2B and an interfering signal that is a signal addressed to the terminal apparatus 2A. Thus, the present embodiment needs only be a case where a terminal apparatus is subjected to inter-user interference by a base station apparatus spatially multiplexing a plurality of terminal apparatuses, and is not limited to the communication system of FIG. 1.

In FIG. 1, the uplink physical channels listed below are used in an uplink wireless communication from a terminal apparatus 2 to the base station apparatus 1. The uplink physical channels are used to transmit information outputted from a higher layer.

PUCCH (Physical Uplink Control Channel)
PUSCH (Physical Uplink Shared Channel)
PRACH (Physical Random Access Channel)

The PUCCH is used to transmit uplink control information (UCI). Note here that the uplink control information contains an ACK (a positive acknowledgement) or an NACK (a negative acknowledgment) to downlink data (downlink transport block, downlink-shared channel: DL-SCH). The ACK/NACK to the downlink data is also referred to as "HARQ-ACK" or "HARQ feedback".

Further, the uplink control information contains channel state information (CSI) on the downlink. Further, the uplink control information contains a scheduling request (SR) that is used to request resources of an uplink-shaped channel (UL-SCH).

The PUSCH is used to transmit uplink data (uplink transport block, UL-SCH). Further, the PUSCH may be used together with the uplink data to transmit the ACK/NACK and/or the channel state information. Further, the PUSCH may be used to transmit only the uplink control information.

Further, the PUSCH is used to transmit an RRC message. The RRC message is information/signal that is processed in a radio resource control (RRC) layer. Further, the PUSCH is used to transmit an MAC CE (control element). Note here that the MAC CE is information/signal that is processed (transmitted) in a medium access control (MAC) layer.

For example, a power headroom may be contained in the MAC CE and reported via the PUSCH. That is, a field in the MAC CE may be used to indicate a level of the power headroom.

The PRACH is used to transmit a random access preamble.

Further, in the uplink wireless communication, an uplink reference signal (UL RS) is used as an uplink physical signal. The uplink physical signal is not used to transmit the information outputted from the higher layer, but is used by a physical layer. Note here that the uplink reference signal contains a DMRS (demodulation reference signal) and an SRS (sounding reference signal).

The DMRS is associated with the transmission of the PUSCH or the PUCCH. For example, the base station apparatus 1 uses the DMRS to make a channel correction to the PUSCH or the PUCCH. The SRS is not associated with the transmission of the PUSCH or the PUCCH. For example, the base station apparatus 1 uses the SRS to measure an uplink channel state.

In FIG. 1, the downlink physical channels listed below are used in a downlink wireless communication from the base station apparatus 1 to a terminal apparatus 2. The downlink physical channels are used to transmit information outputted from a higher layer.

PBCH (Physical Broadcast Channel)
PCFICH (Physical Control Format Indicator Channel)
PHICH (Physical Hybrid automatic repeat request Indicator Channel)
PDCCH (Physical Downlink Control Channel)
EPDCCH (Enhanced Physical Downlink Control Channel)
PDSCH (Physical Downlink Shared Channel)

The PBCH is used to report a master information block (MIB, broadcast channel: BCH) that is commonly used by the terminal apparatuses 2. The PCFICH is used to transmit information indicating a region (e.g. the number of OFDM symbols) that is used in the transmission of the PDCCH.

The PHICH is used to transmit an ACK/NACK to uplink data received by the base station apparatus 1. That is, the PHICH is used to transmit an HARQ indicator (HARQ feedback) indicating the ACK/NACK to the uplink data.

The PDCCH and the EPDCCH are used to transmit downlink control information (DCI). Note here that a plurality of DCI formats are defined for the transmission of the downlink control information. That is, a field for the downlink control information is defined in a DCI formant and mapped to an information bit.

For example, as a DCI format for the downlink, a DCI format 1A that is used in the scheduling of one PDSCH (transmission of one downlink transport block) in one cell is defined.

For example, the DCI format for the downlink contains information pertaining to the allocation of resources of the PDSCH, information pertaining to an MCS (modulation and coding scheme) for the PDSCH, and downlink control information such as a TPC command for the PUCCH. Note here that the DCI format for the downlink is also referred to as "downlink grant (or downlink assignment)".

Further, for example, as a DCI format for the uplink, a DCI format 0 that is used in the scheduling of one PUSCH (transmission of one uplink transport block) in one cell is defined.

For example, the DCI format for the uplink contains information pertaining to the allocation of resources of the PUSCH, information pertaining to an MCS for the PUSCH, and uplink control information such as a TPC command for the PUSCH. The DCI format for the uplink is also referred to as "uplink grant (or uplink assignment)".

In a case where the resources of the PDSCH have been scheduled using the downlink assignment, the terminal apparatus 2 receives the downlink data via the PDSCH thus scheduled. Further, in a case where the resources of the PUSCH have been scheduled using the uplink grant, the terminal apparatus 2 transmits the uplink data and/or the uplink control information via the PUSCH thus scheduled.

The PDSCH is used to transmit downlink data (downlink transport block, DL-SCH). Further, the PDSCH is used to transmit a system information block type 1 message. The system information block type 1 message is cell-specific information.

Further, the PDSCH is used to transmit a system information message. The system information message contains a system information block X other than the system information block type 1. The system information message is cell-specific information.

Further, the PDSCH is used to transmit an RRC message. Note here that an RRC message that is transmitted from the base station apparatus 1 may be shared by the plurality of terminal apparatuses 2 in the cell. Further, an RRC message that is transmitted from the base station apparatus 1 may be a dedicated message (also referred to as "dedicated signaling") for a terminal apparatus 2. That is, UE-specific information is transmitted using a dedicated message for a terminal apparatus 2. Further, the PDSCH is used to transmit an MAC CE.

Note here that the RRC message and/or the MAC CE is/are also referred to as "higher layer signaling".

Further, in the downlink wireless communication, a synchronization signal (SS) and a downlink reference signal (DL RS) are used as downlink physical signals. The downlink physical signals are not used to transmit the information outputted from the higher layer, but is used by a physical layer.

The synchronization signal is used for the terminal apparatus 2 to synchronize a downlink frequency domain and a downlink time domain with each other. Further, the downlink reference signal is used for the terminal apparatus 2 to make a channel correction to a downlink physical channel. For example, the downlink reference signal is used for the terminal apparatus 2 to calculate downlink channel state information.

Note here that the downlink reference signal contains a CRS (cell-specific reference signal), a URS (UE-specific reference signal) associated with the PDSCH, a DMRS (demodulation reference signal) associated with the EPDCCH, an NZP CSI-RS (non-zero power channel state information-reference signal), and a ZP CSI-RS (zero power channel state information-reference signal).

The CRS is transmitted over the full bandwidth of subframes, and are used to demodulate the PBCH/PDCCH/PHICH/PCFICH/PDSCH. The URS associated with the PDSCH is transmitted over a subframe and a band that are used in the transmission of the PDSCH with which the URS is associated, and is used to demodulate the PDSCH with which the URS is associated.

The DMRS associated with the EPDCCH is transmitted over a subframe and a band that are used to transmit the EPDCCH with which the DMRS is associated. The DMRS is used to demodulate the EPDCCH with which the DMRS is associated.

Resources of the NZP CSI-RS are configured by the base station apparatus 1. For example, the terminal apparatus 2 performs signal measurements (channel measurements) with reference to the NZP CSI-RS. Resources of the NP CSI-RS are configured by the base station apparatus 1. The base station apparatus 1 transmits the ZP CSI-RS with zero output. For example, the terminal apparatus 2 performs interference measurements in the resources to which the NZP CSI-RS corresponds.

Note here that the downlink physical channels and the downlink physical signals are also collectively referred to as "downlink signals". Further, the uplink physical channels and the uplink physical signals are also collectively referred to as "uplink signals". Further, the downlink physical channels and the uplink physical channels are also collectively referred to as "physical channels". Further, the downlink physical signals and the uplink physical signals are also collectively referred to as "physical signals".

Further, the BCH, the UL-SCH, and the DL-SCH are transport channels. A channel that is used in the MAC layer is referred to as "transport channel". Further, a unit of the transport channel that is used in the MAC layer is also referred to as "transport block (TB)" or "MAC PDU (protocol data unit)". The transport block is a unit of data that the MAC layer delivers to a physical layer. In the physical layer, the transport block is mapped to a code word, and a coding process and the like is performed for each code word.

Figure 2:
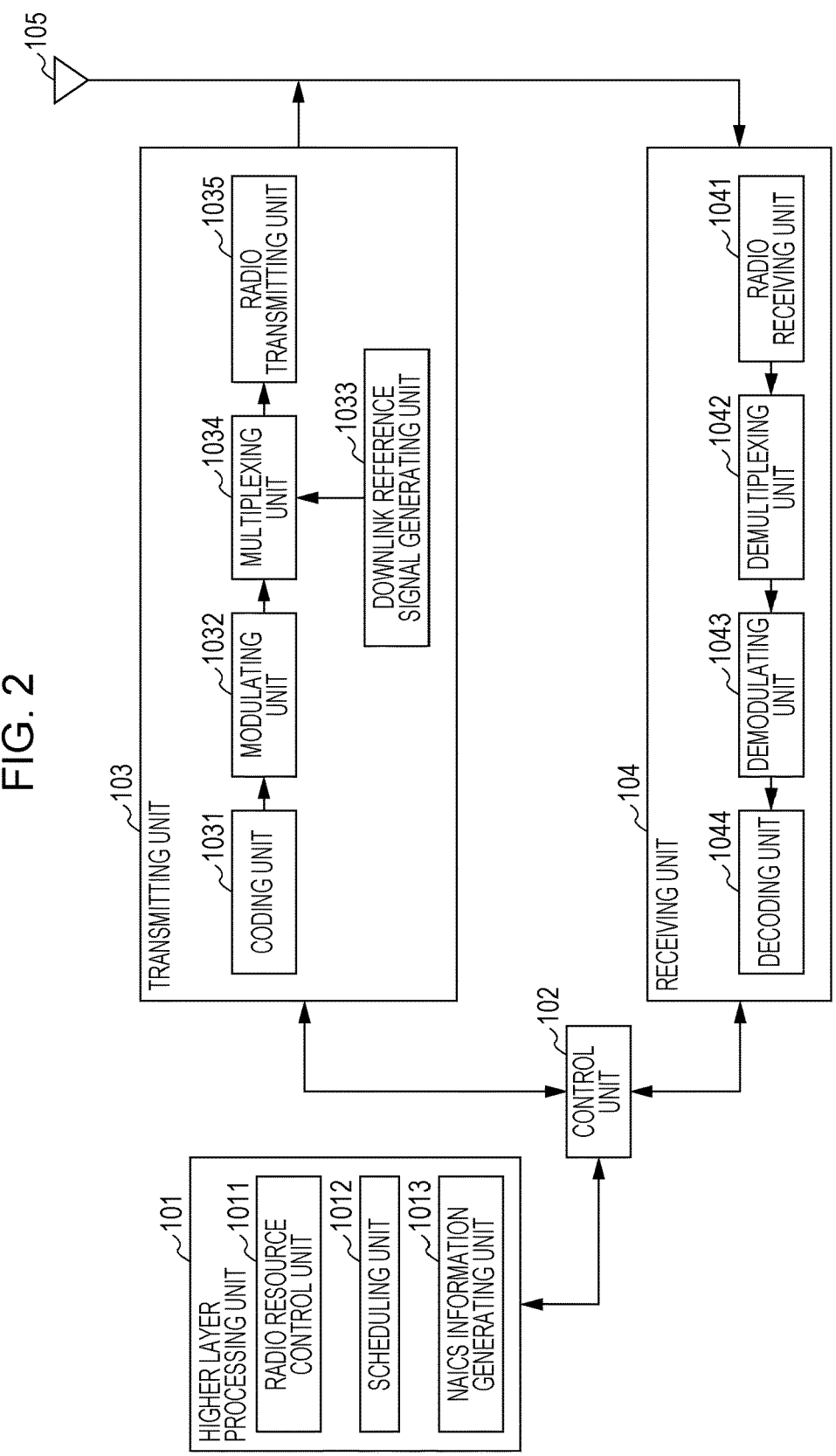
FIG. 2 is a block diagram schematically showing a configuration of a base station apparatus 1 according to the embodiment.

FIG. 2 is a block diagram schematically showing a configuration of the base station apparatus 1 according to the present embodiment. As shown in FIG. 2, the base station apparatus 1 includes a higher layer processing unit 101, a control unit 102, a transmitting unit 103, a receiving unit 104, and a transmitting and receiving antenna 105. Further, the higher layer processing unit 101 includes a radio resource control unit 1011, a scheduling unit 1012. and a NAICS information generating unit 1013. Further, the transmitting unit 103 includes a coding unit 1031, a modulating unit 1032, a downlink reference signal generating unit 1033, a multiplexing unit 1034, and a radio transmitting unit 1035. Further, the receiving unit 104 includes a radio receiving unit 1041, a demultiplexing unit 1042, a demodulating unit 1043, and a decoding unit 1044.

The higher layer processing unit 101 processes a medium access control (MAC) layer, a packet data convergence protocol (PDCP) layer, a radio link control (RLC) layer, and a radio resource control (RRC) layer. Further, the higher layer processing unit 101 generates information that is needed to control the transmitting unit 103 and the receiving unit 104, and outputs the information to the control unit 102.

The radio resource control unit 1011 generates downlink data (transport block), system information, an RRC message, an MAC CE, and the like that are allocated on a downlink PDSCH, or acquires these pieces of information from a higher node. The radio resource control unit 1011 outputs the downlink data to the transmitting unit 103 and outputs the other pieces of information to the control unit 102. Further, the radio resource control unit 1011 manages various types of configuration information of a terminal apparatus 2.

The scheduling unit 1012 determines frequencies and subframes to which physical channels (PDSCH and PUSCH) are allocated, code rates and modulation schemes (or MCSs) of the physical channels (PDSCH and PUSCH), transmission powers, and the like. The scheduling unit 1012 outputs the information thus determined to the control unit 102.

The scheduling unit 1012 generates, on the basis of a scheduling result, information that is used in the scheduling of the physical channels (PDSCH and PUSCH). The scheduling unit 1012 outputs the information thus generated to the control unit 102. In the present embodiment, as one example, the scheduling unit 102 schedules the terminal apparatuses 2A and 2B for the same resources. It should be noted that although the present embodiment assumes, for the sake of ease, that the terminal apparatuses 2A and 2B are scheduled for the same resources, the terminal apparatuses 2A and 2B may be scheduled for different resources under the condition that the terminal apparatus 2A can acquire the allocation of resources to the terminal apparatus 2B.

The NAICS information generating unit 1013 generates NAICS information and outputs the NAICS information to the control unit 102. The NAICS information is information that indicates whether the base station apparatus 1 instructs a terminal apparatus 2 to cancel or suppress an interfering signal under NAICS. The NAICS information is used for the base station apparatus 1 to generate downlink control information of a terminal apparatus 2. For example, in a case where NAICS information of the terminal apparatus 2A indicates that the terminal apparatus 2A is instructed to perform NAICS, the base station apparatus 1 can generate downlink control information of the terminal apparatus 2A so that the downlink control information contains information that is needed for the terminal apparatus 2A to perform a receiving process under NAICS. It should be noted that the NAICS information generating unit 1013 may generate NAICS information on the basis of information contained in terminal information notified from a terminal apparatus 2 or be generated by the base station apparatus 1 regardless of the terminal information. For example, in a case where the base station apparatus 1 notifies, as downlink control information, information pertaining to an interfering terminal apparatus, the NAICS information generating unit 1013 may generate NAICS information so that the number of terminal apparatuses instructed to perform NAICS matches the number of terminal apparatuses of which the base station apparatus 1 notifies the downlink control information. Further, without being limited to a case where the NAICS scheme is used, the NAICS information is applicable to a case where a scheme for canceling or suppressing an interfering signal is used.

The control unit 102 generates, on the basis of the information inputted from the higher layer processing unit 101, control signals in accordance with which the transmitting unit 103 and the receiving unit 104 are controlled. Further, the control unit 102 determines an MCS on the basis of the information inputted from the higher layer processing unit 101. Further, the control unit 102 determines the number of code words on the basis of the information inputted from the higher layer processing unit 101. Further, the control unit 102 determines the number of layers, an antenna port number, a scrambling identity (scrambling identifier) on the basis of the information inputted from the higher layer processing unit 101.

The control unit 102 generates downlink control information on the basis of the information inputted from the higher layer processing unit 101 and outputs the downlink control information to the transmitting unit 103. In a case where the NAICS information indicates that the terminal apparatus 2 is instructed to perform NAICS, the control unit 102 can incorporate, into the downlink control information, information indicating whether to perform interference cancellation or suppression. In a case of allocating the downlink control information to a UE-specific search space (USS), the control unit 102 can incorporate, into the downlink control information, the information indicating whether to interference cancellation or suppression. Further, the control unit 102 can generate the downlink control information using a DCI format including the information indicating whether to perform interference cancellation or suppression. It should be noted that the NAICS information may be incorporated into the downlink control information.

In accordance with the control signal inputted from the control unit 102, the transmitting unit 103 generates a downlink reference signal, codes and modulates the HARQ indicator, the downlink control information, and the downlink data, which were inputted from the higher layer processing unit 101, multiplexes the PHICH, the PDCCH, the EPDCCH, the PDSCH, and the downlink reference signal, and transmits the multiplexed signals to the terminal apparatus 2 via the transmitting and receiving antenna 105.

The coding unit 1031 codes the HARQ indicator, the downlink control information, and the downlink data, which were inputted from the higher layer processing unit 101, under a predetermined coding scheme such as block coding, convolutional coding, or turbo coding or under a coding scheme determined by the radio resource control unit 1011. The modulating unit 1032 receives coding bits from the coding unit 1031 and modulates the coding bits under a predetermined modulation scheme such as BPSK (binary phase shift keying), QPSK (quadrature phase shift keying), 16 QAM (quadrature amplitude modulation), 64 QAM, or 256 QAM or under a modulation scheme determined by the radio resource control unit 1011.

On the basis of a physical identifier (PCI) or the like for identifying the base station apparatus 1, the downlink reference signal generating unit 1033 generates, as the downlink reference signal, a sequence known by the terminal apparatus 2 that is determined according to a predetermined rule. Further, the downlink reference signal generating unit 1033 can generate a DMRS on the basis of the scrambling identity.

The multiplexing unit 1034 multiplexes a modulation symbol of each channel modulated, the downlink reference signal thus generated, and the downlink control information thus generated. That is, the multiplexing unit 1034 allocates the modulation symbol of each channel modulated, the downlink reference signal, and the downlink control information on a resource element.

The radio transmitting unit 1035 performs inverse fast Fourier transform (IFFT) on the modulation symbols and the like thus multiplexed, performs modulation under an OFDM scheme, appends a cycle prefix (CP) to an OFDM-modulated OFDM symbol, and generates a baseband digital signal. The radio transmitting unit 1035 converts the baseband digital signal thus generated into an analog signal in a desired band by using filtering, DA (digital-to-analog) conversion, frequency conversion, power amplification, and the like. The radio transmitting unit 1035 outputs the analog signal thus generated to the transmitting and receiving antenna 105 and transmits it.

In accordance with the control signal inputted from the control unit 102, the receiving unit 104 demultiplexes, demodulates, and decodes a received signal received from the terminal apparatus 2 via the transmitting and receiving antenna 105 and outputs decoded information to the higher layer processing unit 101.

By using frequency conversion, filtering, AD (analog-to-digital) conversion, amplitude control, and the like, the wireless receiving unit 1041 converts, into a baseband digital signal, an uplink signal received via the transmitting and receiving antenna 105.

The radio receiving unit 1041 eliminates, from the digital signal thus converted, a portion corresponding to the CP. The radio receiving unit 1041 performs fast Fourier transform (FFT) on the signal from which the CP has been eliminated, extracts a frequency-domain signal, and outputs the frequency-domain signal to the demultiplexing unit 1042.

The demultiplexing unit 1042 demultiplexes the signal inputted from the radio receiving unit 1041 into signals such as the PUCCH, the PUSCH, and the uplink reference signal. It should be noted that this demultiplexing is performed on the basis of radio resource allocation information contained in an uplink grant determined in advance by the wireless resource control unit 1011 of the base station apparatus 1 and notified to each terminal apparatus 2.

Further, the demultiplexing unit 1042 makes compensations for the channels of the PUCCH and the PUSCH. Further, the demultiplexing unit 1042 demultiplexes the uplink reference signal.

The demodulating unit 1043 performs inverse discrete Fourier transform on the PUSCH, acquires the modulation symbols, and performs demodulation of the received signal on each of the modulation symbols of the PUCCH and the PUSCH under a modulation scheme such as BPSK, QPSK, 16 QAM, 64 QAM, or 256 QAM or under a modulation scheme notified in advance by the base station apparatus 1 to each terminal apparatus 2 through the uplink grant. It should be noted that the inverse discrete Fourier transform may be inverse fast Fourier transform corresponding to the number of subcarriers of the PUSCH.

The decoding unit 1044 decodes the coding bits of the PUCCH and the PUSCH thus demodulated. This decoding is performed under a predetermined coding scheme and at predetermined coding rates or coding rates notified in advance by the base station apparatus 1 to the terminal apparatus 2 through the uplink grant. The decoding unit 1044 outputs the uplink data thus decoded and the uplink control information to the higher layer processing unit 101.

In the case of retransmission of the PUSCH, the decoding unit 1044 performs decoding using coding bits retained in an HARQ buffer that is inputted from the higher layer processing unit 101 and the coding bits thus demodulated.

Figure 3:
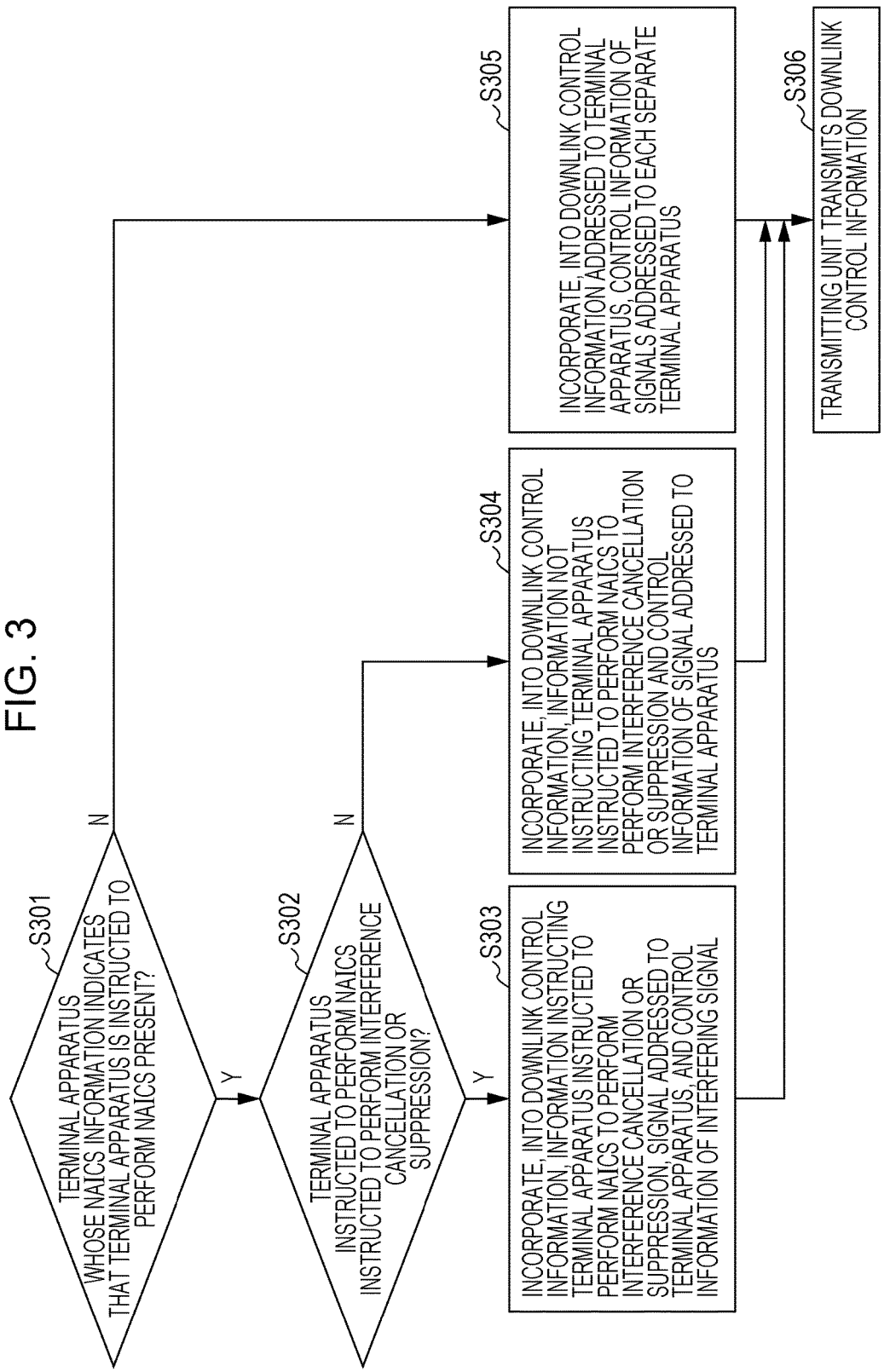
FIG. 3 is a diagram showing the flow of a process in which a control unit 102 configures downlink control information.

FIG. 3 is a diagram showing the flow of a process in which the control unit 102 configures downlink control information of the terminal apparatuses 2A and 2B.

In S301, the control unit 102 determines the presence or absence of a terminal apparatus whose NAICS information indicates that the terminal apparatus is instructed to perform NAICS.

In S302, the control unit 102 determines whether to instruct the terminal apparatus instructed to perform NAICS to perform interference cancellation or suppression.

In S303, the control unit 102 incorporates, into downlink control information addressed to the terminal apparatus, information instructing the terminal apparatus to perform interference cancellation or suppression, information on a signal addressed to the terminal apparatus instructed to perform NAICS, and information on the interfering signal.

In S304, the control unit 102 incorporates, into the downlink control information addressed to the terminal apparatus, information not instructing the terminal apparatus to perform interference cancellation or suppression and the information on the signal addressed to the terminal apparatus instructed to perform NAICS.

In S305, the control unit 102 incorporates, into the downlink control information addressed to the terminal apparatus, information on signals addressed to each separate terminal apparatus.

In S306, the transmitting unit 103 transmits the downlink control information to each terminal apparatus.

Figure 4:
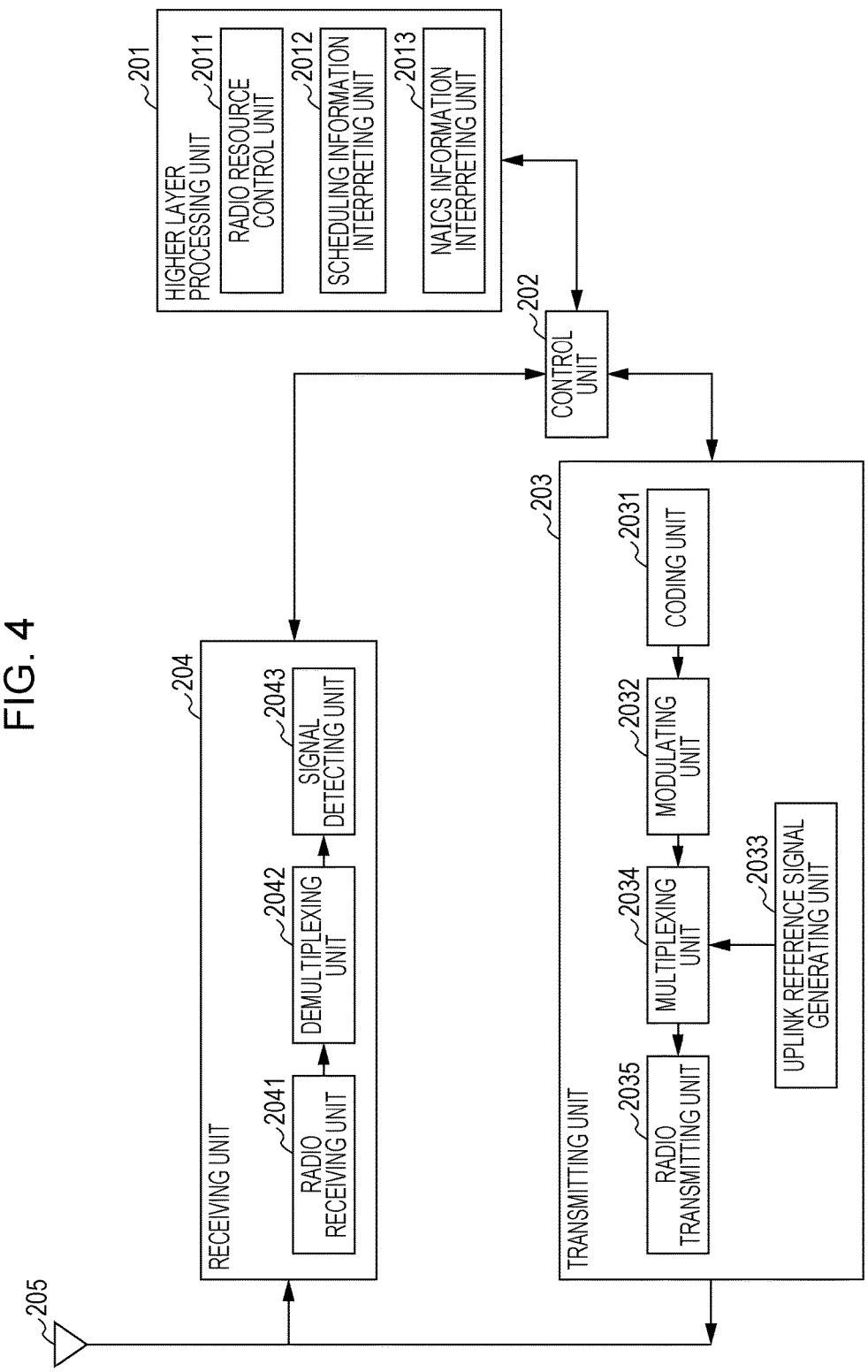
FIG. 4 is a block diagram schematically showing a configuration of a terminal apparatus 2 according to the embodiment.

FIG. 4 is a block diagram schematically showing a configuration of a terminal apparatus 2 according to the present embodiment. As shown in FIG. 4, the terminal apparatus 2 includes a higher layer processing unit 201, a control unit 202, a transmitting unit 203, a receiving unit 204, and a transmitting and receiving antenna 205. Further, the higher layer processing unit 201 includes a radio resource control unit 2011, a scheduling information interpreting unit 2012, and a NAICS information interpreting unit 2013. Further, the transmitting unit 203 includes a coding unit 2031, a modulating unit 2032, an uplink reference signal generating unit 2033, a multiplexing unit 2034, and a radio transmitting unit 2035. Further, the receiving unit 204 includes a wireless receiving unit 2041, a demultiplexing unit 2042, and a signal detecting unit 2043.

The higher layer processing unit 201 outputs, to the transmitting unit 203, uplink data (transport block) generated by a user's operation or the like. Further, the higher layer processing unit 201 processes a medium access control (MAC) layer, a packet data convergence protocol (PDCP) layer, a radio link control (RLC) layer, and a radio resource control (RRC) layer.

The radio resource control unit 2011 manages various types of configuration information of the terminal apparatus 2. Further, the radio resource control unit 2011 generates information that is allocated on each uplink channel, and outputs the information to the transmitting unit 203.

The scheduling information interpreting unit 2012 interprets downlink control information received via the receiving unit 204 and determines scheduling information. Further, the scheduling information interpreting unit 2012 generates, on the basis of the scheduling information, control information for controlling the receiving unit 204 and the transmitting unit 204 and outputs the control information to the control unit 202.

The NAICS information interpreting unit 2013 interprets NAICS information received via the receiving unit 204 and determines whether there is a NAICS instruction. Further, the NAICS information interpreting unit 2013 outputs a result of the determination of the NAICS information to the control unit 202. It should be noted that the NAICS information interpreting unit 2013 may determine the result of the determination of the NAICS information according to the status (such as reception quality) of the terminal apparatus 2.

Further, the NAICS information interpreting unit 2013 generates terminal information and outputs the terminal information to the control unit 202. It should be noted that the terminal information is information that pertains to a function of the terminal apparatus 2. For example, the terminal information may be information that indicates whether the terminal apparatus 2 has a NAICS function or, regardless of whether the terminal apparatus 2 has a NAICS function, may be information that determines whether to perform NAICS in consideration of reception quality or the like.

The control unit 202 generates, on the basis of the information inputted from the higher layer processing unit 201, control signals in accordance with which the receiving unit 204 and the transmitting unit 203 are controlled. The control unit 202 outputs the control signals thus generated to the receiving unit 204 and the transmitting unit 203 to control the receiving unit 204 and the transmitting unit 203. The control unit 202 outputs the result of the determination of the NAICS information to the receiving unit 204 and outputs the uplink control information and the uplink data, including the terminal information and the like, to the transmitting unit 203.

The control unit 202 interprets, on the basis of the result of the determination of the NAICS information and information as to whether to perform interference cancellation or suppression, the downlink control information received via the receiving unit 204. The downlink control information may contain the information as to whether to perform interference cancellation or suppression. For example, the information as to whether to perform interference cancellation or suppression may be interpreted from the user-specific search space.

For example, in a case where the NAICS information indicates that the terminal apparatus 2 is instructed to perform NAICS and the information as to whether to perform interference cancellation or suppression indicates that the terminal apparatus 2 is instructed to perform interference cancellation or suppression, the control unit 202 can determine information for detecting a signal addressed to the terminal apparatus 2 and information for canceling or suppressing an interfering signal.

For example, in a case where the NAICS information indicates that the terminal apparatus 2 is instructed to perform NAICS and the information as to whether to perform interference cancellation or suppression, which the downlink control information may contain, indicates that the terminal apparatus 2 is not instructed to perform interference cancellation or suppression, the terminal apparatus 2 can determine only control information addressed to the terminal apparatus. Doing so makes it possible to allocate, to the terminal apparatus 2, information that is used as control information of the interfering signal, thus making it possible to improve throughput.

In accordance with the control signal inputted from the control unit 202, the receiving unit 204 demultiplexes, demodulates, and decodes a received signal received from the base station apparatus 1 via the transmitting and receiving antenna 205 and outputs decoded information to the higher layer processing unit 201.

By using frequency conversion, filtering, AD conversion, amplitude control, and the like, the wireless receiving unit 2041 converts, into a baseband digital signal, an uplink signal received via the transmitting and receiving antenna 205.

Further, the radio receiving unit 2041 eliminates, from the digital signal thus converted, a portion corresponding to the CP, performs fast Fourier transform (FFT) on the signal from which the CP has been eliminated, and extracts a frequency-domain signal.

The demultiplexing unit 2042 demultiplexes the extracted signal into the PHICH, the PDCCH, the EPDCCH, the PDSCH, and the downlink reference signal. Further, the demultiplexing unit 2042 makes compensations for the channels of the PHICH, the PDCCH, and the EPDCCH on the basis of channel estimation values of desired signals as obtained from channel measurements, detects the downlink control information, and outputs the downlink control information to the control unit 202. Further, the control unit 202 outputs the PDSCH and the channel estimation values of the desired signals to the signal detecting unit 2043. It should be noted that the channel estimation is done on the basis of the number of layers, an antenna port number, and a scrambling identity that are inputted from the control unit 202 and addressed to the terminal apparatus 2.

Further, in a case where there is a NAICS instruction, the demultiplexing unit 2042 does the channel estimation of the interfering signal on the basis of the number of layers of the interfering signal, the antenna port number, and the scrambling identity that are inputted from the control unit 202. The demultiplexing unit 2042 outputs a channel estimation value of the interfering signal to the signal detecting unit 2043.

The signal detecting unit 2043 detects the downlink data (transport block) with reference to the PDSCH, the channel estimation values, the result of the determination of the NAICS information, and the information as to whether to perform interference cancellation or suppression, and outputs the downlink data to the higher layer processing unit 201. In a case where the result of the determination of the NAICS information indicates that the terminal apparatus 2 is instructed to perform NAICS and the information as to whether to perform interference cancellation or suppression indicates that the terminal apparatus 2 is instructed to perform interference cancellation or suppression, the signal detecting unit 20432 cancels or suppresses the interfering signal on the basis of the channel estimation values that are inputted from the demultiplexing unit 2042 and the number of layers of the interfering signal and the antenna port number that are inputted from the control unit 202. It should be noted that the method for canceling or suppressing the interfering signal needs only be a method that requires parameters pertaining to the interfering signal. Examples of the method include linear detection, maximum likelihood estimation, interference cancellers, and the like. Examples of linear detection include LMMSE-IRC (linear minimum mean square error-interference rejection combining), Enhanced LMMSE-IRC, WLMMSE-IRC (widely linear MMSE-IRC), and the like. Examples of maximum likelihood estimation includes ML (maximum likelihood), R-ML (reduced complexity ML), iterative ML, iterative R-ML, and the like. Examples of interference cancellers include turbo SIC (successive interference cancellation), PIC (parallel interference cancellation), L-CWIC (linear code word level SIC), ML-CWIC (ML code word level SIC), SLIC (symbol level IC), and the like. This makes it possible to improve throughput.

Further, in a case where the NAICS information indicates that the terminal apparatus 2 is instructed to perform NAICS and the information as to whether to perform interference cancellation or suppression indicates that the terminal apparatus 2 is not instructed to perform interference cancellation or suppression, signal detection that does not entail interference cancellation can be performed. In that case, only control information addressed to the terminal apparatus 2 can be determined. This makes it possible to increase control information of a signal addressed to the terminal apparatus 2, thus making it possible to improve throughput.

In accordance with the control signal inputted from the control unit 202, the transmitting unit 203 generates an uplink reference signal, codes and modulates the uplink data (transport block) inputted from the higher layer processing unit 201, multiplexes the PUCCH, the PUSCH, and the uplink reference signal thus generated, and transmits the multiplexed signals to the base station apparatus 1 via the transmitting and receiving antenna 205.

The coding unit 2031 receives uplink control information from the higher layer processing unit 201 and codes the uplink control information by convolutional coding, block coding, or the like. Further, the coding unit 2031 performs turbo coding on the basis of information that is used in the scheduling of the PUSCH.

The modulating unit 2032 receives coding bits from the coding unit 2031 and modulates the coding bits under a predetermined modulation scheme such as BPSK, QPSK, 16 QAM, or 64 QAM notified through the downlink control information or under a modulation scheme determined for each channel.

On the basis of a physical cell identifier (referred to as "physical cell identity: PCI", "cell ID", or the like), a band on which the uplink reference signal is allocated, a cyclic shift notified through an uplink grant, the values of parameters in the generation of a DMRS sequence, the uplink reference signal generating unit 2033 generates a sequence that is determined by a predetermined rule (formula).

In accordance with the control signal inputted from the control unit 202, the multiplexing unit 2034 sorts the modulation symbols of the PUSCH in parallel and then performs discrete Fourier transform (DFT) on the modulation symbols. Further, the multiplexing unit 2034 multiplexes, for each transmitting antenna port, the signals of the PUCCH and the PUSCH and the uplink reference signal thus generated. That is, the multiplexing unit 2034 allocates, on a resource element for each transmitting antenna port, the signals of the PUCCH and the PUSCH and the uplink reference signal thus generated. It should be noted that the discrete Fourier transform may be fast Fourier transform corresponding to the number of subcarriers of the PUCCH and the PUSCH.

The radio transmitting unit 2035 performs inverse fast Fourier transform on the multiplexed signals, performs modulation under an SC-FDMA scheme to generate an SC-FDMA symbol, appends a CP to the SC-FDMA symbol thus generated, and generates a baseband digital signal. The radio transmitting unit 2035 converts the baseband digital signal thus generated into an analog signal in a desired band by using filtering, DA conversion, frequency conversion, power amplification, and the like. The radio transmitting unit 2035 outputs the analog signal thus generated to the transmitting and receiving antenna 205 and transmits it.

Figure 5:
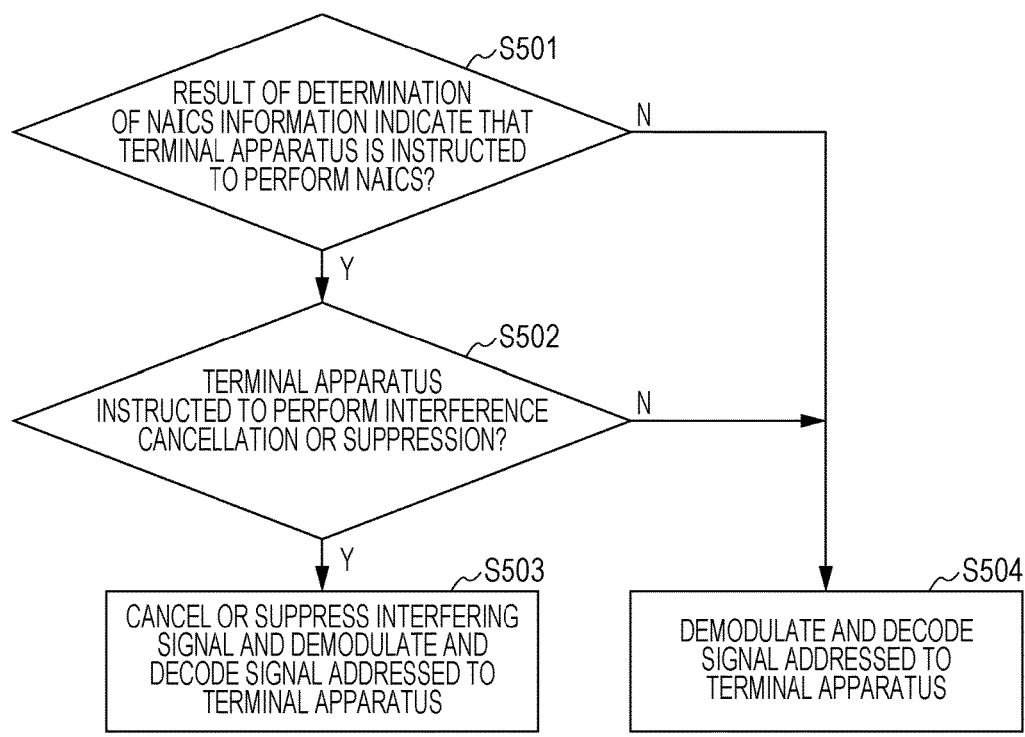
FIG. 5 is a diagram showing the flow of a process that a demultiplexing unit 2042 and a signal detecting unit 2043 perform.

FIG. 5 is a diagram showing the flow of a process that the demultiplexing unit 2042 and the signal detecting unit 2043 perform.

In S501, the signal detecting unit 2043 determines whether a result of determination of NAICS information of a terminal apparatus 2 indicates that the terminal apparatus 2 is instructed to perform NAICS. In a case where the result of the determination of the NAICS information of the terminal apparatus 2 indicates that the terminal apparatus 2 is instructed to perform NAICS, the process proceeds to S502. On the other hand, in a case where the result of the determination of the NAICS information of the terminal apparatus 2 does not indicate that the terminal apparatus 2 is instructed to perform NAICS, the process proceeds to S504.

In S502, the signal detecting unit 2043 determines whether a result of determination of information indicating whether the terminal apparatus 2 performs interference cancellation or suppression instructs the terminal apparatus 2 to perform interference cancellation or suppression. In a case where the terminal apparatus 2 is instructed to perform interference cancellation or suppression, the process proceeds to S503. On the other hand, in a case where the terminal apparatus 2 is not instructed to perform interference cancellation or suppression, the process proceeds to S504.

In S503, the signal detecting unit 2043 cancels or suppresses an interfering signal and demodulates and decodes a signal addressed to the terminal apparatus 2.

In S504, the signal detecting unit 2043 demodulates and decodes a signal addressed to the terminal apparatus 2.

It should be noted that, although, as shown in FIG. 1, the present embodiment is directed to a communication system in which inter-user interference occurs, the present embodiment may alternatively be directed to a communication system in which inter-cell interference occurs. In a communication system in which inter-cell interference occurs, received signals at a terminal apparatus includes a desired signal addressed to the terminal apparatus (first terminal apparatus and a signal addressed to a terminal apparatus (second terminal apparatus) causing inter-cell interference. A base station apparatus connected to the first terminal apparatus cooperates with another base station apparatus to receive information for canceling or suppressing the signal addressed to the second terminal apparatus (such as the number of layers, an antenna port number, and a scrambling identity of the second terminal apparatus). The base station apparatus connected to the first terminal apparatus determines whether to instruct the first terminal apparatus to perform NAICS and, in a case where the base station apparatus instructs the first terminal apparatus to perform NAICS, transmits, to the first terminal apparatus, downlink control information containing information indicating whether to perform interference cancellation or suppression. In a case where a result of determination of NAICS information as notified from the higher layer processing unit 201 indicates that the terminal apparatus is instructed to perform NAICS and a result of determination of the information indicating whether to perform interference cancellation or suppression indicates interference cancellation or suppression, the terminal apparatus grasps parameters pertaining to the terminal apparatus from the downlink control information and cancels or suppresses the interfering signal.

Thus, a terminal apparatus of the present invention is a first terminal apparatus that communicates with a base station apparatus, and includes: a higher layer processing unit that determines NAICS information indicating whether to instruct the terminal apparatus to perform NAICS; a receiving unit that receives downlink control information that is transmitted from the base station apparatus; and a control unit that alters the interpretation of the downlink control information on the basis of a configuration determined by the higher layer processing unit. Further, in a case where a result of determination of the NAICS information determined by the higher layer processing unit indicates that the first terminal apparatus is instructed to perform NAICS and information indicating whether to perform interference cancellation or suppression indicates interference cancellation or suppression, the control unit cancels or suppresses interference from communication of the second terminal apparatus.

Further, a base station apparatus of the present invention is a base station apparatus that communicates with a first terminal apparatus, and includes: a higher layer processing unit that configures NAICS information indicating whether to instruct the first terminal apparatus to perform NAICS; a control unit that alters parameters of downlink control information on the basis of whether the NAICS information indicates that the base station apparatus instructs the first terminal apparatus to perform NAICS; and a transmitting unit that transmits the downlink control information. Further, in the base station apparatus of the present invention, in a case where the NAICS information indicates that the base station apparatus instructs the first terminal apparatus to perform NAICS, information indicating whether to perform interference cancellation or suppression is incorporated into the downlink control information and the downlink control information is transmitted to the first terminal apparatus.

It should be noted that in a case where the NAICS information indicates that the base station apparatus instructs the first terminal apparatus to perform NAICS and the information indicating whether to perform interference cancellation or suppression indicates that interference cancellation or suppression is performed, the terminal apparatus of the present invention may blind-detect an interference signal whose control information was not transmitted by the base station apparatus and cancel or suppress the interference signal thus blind-detected. This makes it possible to cancel more interfering signals, thus making it possible to improve throughput.

Performing processes such as those described above makes it possible to suppress information on an interfering signal that is needed to cancel or suppress the interfering signal, thus making it possible to improve throughput.

A program that runs on a base station apparatus and a terminal apparatus according to the present invention is a program that controls a CPU or the like (i.e., a program that causes a computer to function) so that the functions of the above-described embodiment of the present invention are achieved. Moreover, information that is handled by these apparatuses is temporarily accumulated in RAM during processing thereof, stored in various types of ROM and/or HDD after that, and read out by the CPU as needed for modification and/or writing. Examples of a storage medium in which the program is stored may include semiconductor media (such as ROM and nonvolatile memory cards), optical storage media (such as DVDs, MOs, CDs, and BDs), magnetic storage media (such as magnetic tapes and flexible disks). Further, not only are the functions of the embodiment described above achieved by executing the program loaded, but also the functions of the present invention may be achieved by executing processing in cooperation with an operating system or another application program on the basis of instructions from the program.

Further, the program can be distributed to the market by being stored in a portable storage medium or being transferred to a server computer connected via a network such as the Internet. In this case, a storage device of the server computer is also encompassed in the present invention. Further, one, some, or all of the base station apparatus and the terminal apparatus in the embodiment described above may be achieved as an LSI that is typically an integrated circuit. Each functional block of the receiving apparatus may separately take the form of a chip, or one, some, or all of them may be integrated into a chip. In a case where each functional block is integrated into a circuit, an integrated circuit control unit that controls them is added.

Further, the technique of circuit integration may be achieved by a dedicated circuit or a general-purpose processor, as well as an LSI. Further, in a case where a technology of integrated circuit construction alternative to LSI comes out due to the advancement of technology, it is possible to use integrated circuits based on such a technology.

It should be noted that the present invention is not limited to the embodiment described above. A terminal apparatus of the present invention is not limited to being applied to a base station apparatus, and is of course applicable to stationary or immovable electronic devices that are installed indoors or outdoors such as audiovisual equipment, kitchen appliances, cleaning and washing machines, air-conditioning equipment, office devices, vending machines, and other domestic appliances.

Although an embodiment of the present invention has been described in detail above with reference to the drawings, a specific configuration is not limited to this embodiment, and designs and the like are also encompassed in the patent claims, provided such designs and the like do not depart from the spirit of the present invention.

INDUSTRIAL APPLICABILITY

The present invention is suitably applicable to a terminal apparatus, a base station apparatus, and a communication method.

The present disclosure contains subject matter related to that disclosed in Japanese Priority Patent Application JP 2014-057350 filed in the Japan Patent Office on Mar. 20, 2014, the entire contents of which are hereby incorporated by reference.

REFERENCE SIGNS LIST

1 Base station apparatus
2A, 2B Terminal apparatus
1-1 Coverage
101 Higher layer processing unit
102 Control unit
103 Transmitting unit
104 Receiving unit
105 Transmitting and receiving antenna
1011 Radio resource control unit
1012 Scheduling unit
1013 NAICS information generating unit
1031 Coding unit
1032 Modulating unit
1033 Downlink reference signal generating unit
1034 Multiplexing unit
1035 Radio transmitting unit
1041 Radio receiving unit
1042 Demultiplexing unit
1043 Demodulating unit
1044 Decoding unit 201 Higher layer processing unit
202 Control unit
203 Transmitting unit
204 Receiving unit
205 Transmitting and receiving antenna
2011 Radio resource control unit
2012 Scheduling information interpreting unit
2013 NAICS information interpreting unit
2031 Coding unit
2032 Modulating unit
2033 Uplink reference signal generating unit
2034 Multiplexing unit
2035 Radio transmitting unit
2041 Radio receiving unit
2042 Demultiplexing unit
2043 Signal detecting unit

The invention claimed is:

1. A terminal apparatus, comprising:
higher layer processing circuitry that interprets predetermined information on a higher layer,
receiving circuitry that receives downlink control information and a downlink shared channel, and
signal detecting circuitry that detects downlink data using the downlink control information and the downlink shared channel, wherein
the predetermined information is information used to generate the downlink control information;
in a case where the predetermined information indicates first information, the downlink control information contains information related to resource allocation;
in a case where the predetermined information indicates second information and the downlink control information is received in a user-equipment specific (UE-specific) search space, the downlink control information contains the information related to resource allocation and information indicating whether to perform interference cancellation or suppression;
in a case where the predetermined information indicates the first information, the signal detecting circuitry demodulates the downlink shared channel based on a number of layers included therein and an antenna port number;
in a case where the predetermined information indicates the second information, the downlink control information is received in the UE-specific search space, and the information indicating whether to perform interference cancellation or suppression instructs the interference cancellation or the suppression, the signal detecting circuitry demodulates the downlink shared channel based on the number of layers included therein and the antenna port number, and a number of layers of an interfering signal and the antenna port number;
in a case where the predetermined information indicates the second information, the downlink control information is received in the UE-specific search space, and the information indicating whether to perform interference cancellation or suppression does not instruct the interference cancellation or the suppression, the signal detecting circuitry demodulates the downlink shared channel based on the number of layers included therein and the antenna port number; and
the interfering signal is a signal that is addressed to a terminal apparatus other than the terminal apparatus.

2. The terminal apparatus according to claim 1, wherein the downlink control information is generated in a predetermined downlink control information format.

3. A communication method in a terminal apparatus, comprising:
a higher layer processing step of interpreting predetermined information on a higher layer,
a receiving step of receiving downlink control information and a downlink shared channel, and
a signal detecting step of detecting downlink data using the downlink control information and the downlink shared channel, wherein
the predetermined information is information used to generate the downlink control information;
in a case where the predetermined information indicates first information, the downlink control information contains information related to resource allocation;
in a case where the predetermined information indicates second information and the downlink control information is received in a user-equipment specific (UE-specific) search space, the downlink control information contains the information related to resource allocation and information indicating whether to perform interference cancellation or suppression;
in a case where the predetermined information indicates the first information, the signal detecting circuitry demodulates the downlink shared channel based on a number of layers included therein and an antenna port number;
in a case where the predetermined information indicates the second information, the downlink control information is received in the UE-specific search space, and the information indicating whether to perform interference cancellation or suppression instructs the interference cancellation or the suppression, the signal detecting step further includes demodulating the downlink shared channel based on the number of layers included therein and the antenna port number, and a number of layers of an interfering signal and the antenna port number;
in a case where the predetermined information indicates the second information, the downlink control information is received in the UE-specific search space, and the information indicating whether to perform interference cancellation or suppression does not instruct the interference cancellation or the suppression, the signal detecting step further includes demodulating the downlink shared channel based on the number of layers included therein and the antenna port number; and
the interfering signal is a signal that is addressed to a terminal apparatus other than the terminal apparatus.

* * * * *